United States Patent

Hall et al.

[15] 3,677,223

[45] July 18, 1972

[54] PRESSURE SENSITIVE FINGERPRINT INPUT FOR IDENTIFICATION APPARATUS

[72] Inventors: William D. Hall; Lewis H. Shaefer, both of Van Nuys, Calif.

[73] Assignee: KMS Industries, Inc., Ann Arbor, Mich.

[22] Filed: Oct. 7, 1970

[21] Appl. No.: 78,838

[52] U.S. Cl. ....... 118/10, 118/31.5

[51] Int. Cl. ....... B05c 11/00, B41k 1/00

[58] Field of Search ....... 118/31.5, 10, 500; 117/.5; 95/12 R

[56] References Cited

UNITED STATES PATENTS

| | | | |
|---|---|---|---|
| 2,746,192 | 5/1956 | Norton | 118/500 |
| 2,782,543 | 2/1957 | Soto | 118/31.5 |
| 3,163,557 | 12/1964 | Brutten et al. | 118/31.5 X |
| 3,482,498 | 12/1969 | Becker | 95/12 R |
| 3,479,987 | 11/1969 | French | 118/31.5 |

*Primary Examiner*—Morris Kaplan
*Attorney*—Barnes, Kisselle, Raisch & Choate

[57] ABSTRACT

In a fingerprint identification system utilizing real time fingerprint input of a person, a means for limiting the pressure with which a fingerprint is applied to prevent illegible or smudged prints which are not faithful reproductions of the intended input.

2 Claims, 2 Drawing Figures

INVENTORS
William D. Hall
BY Lewis H. Shaefer
Barnes, Kisselle, Raisch & Choate
ATTORNEYS

PRESSURE SENSITIVE FINGERPRINT INPUT FOR IDENTIFICATION APPARATUS

This invention relates to a Pressure Sensitive Fingerprint Input for Identification Apparatus and more particularly to a means for facilitating the input of real time fingerprint data in a manner which will be convenient and trouble free.

In connection with an identification system which is described in detail in a co-pending application of Thomas et al., Ser. No. 48,373, filed June 22, 1970, on a "Method and Apparatus for Personal Identification," it is essential that a fingerprint input be provided in an optical system. Since this must be done by individuals, it is important that it be done as easily as possible and with as little chance for error as is possible.

The input generally involves impressing the fingerprint on a transparent surface with an oil film of some kind on the surface so that the fingerprint will leave a recognizable and true pattern. It is also important that a fingerprint be erased between one operation and another so that there can be no so-called noise or confusion in the input.

It is, therefore, an object of the invention to provide a fingerprint input which is simple and easy to operate.

The present invention contemplates an improvement on the system described in a co-pending application of Hall et al., Ser. No. 86,087, filed Nov. 2, 1970, on a "Clean Window Assembly for Real Time Fingerprint Input to Fingerprint Identification System."

Other objects and features of the invention will be apparent in the following description and claims in which the principles of operation are set forth in connection with the best mode presently contemplated.

Figure 1:
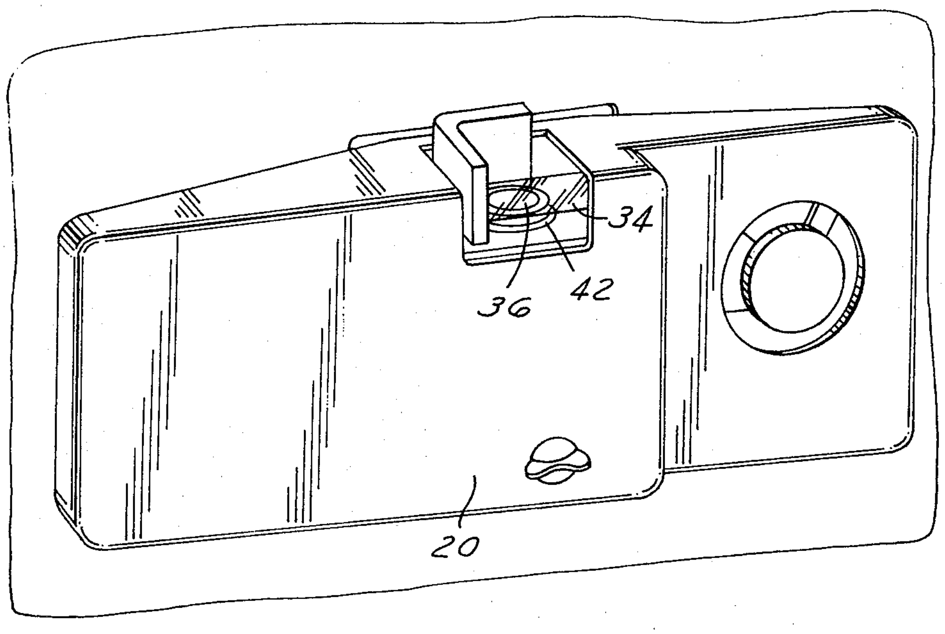

Drawings accompany the disclosure and the various views thereof may be briefly described as follows:

FIG. 1, a perspective view of the fingerprint input assembly of an identification system.

Figure 2:
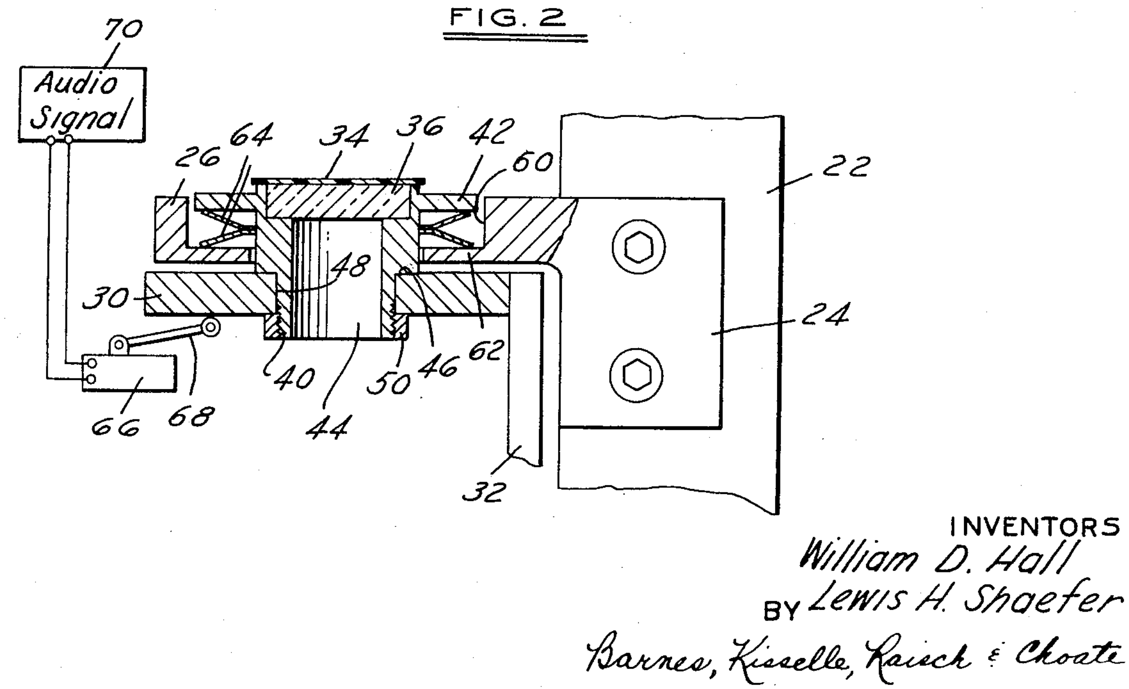

FIG. 2, a sectional view illustrating the invention.

REFERRING TO THE DRAWINGS

FIG. FIG. 1, an assembly which is shielded by an outer case 20 is held on a suitable mount 22 in FIG. 2 by a bracket 24 carrying a bracket platform 26. Details of construction of this system are illustrated and described in the co-pending application of Hall et al., Ser. No. 86,087, filed Nov. 2, 1970, and will not be duplicated here.

A sub-plate 30 carries a support plate 32 on which the shield 20 would be mounted, this shield carrying input and output reels for a transparent film 34 which passes over a glass insert 36 held in a bushing 40 having a top flanged portion 42. The glass disc 36 is held in a counterbore at the top of an opening 44 in the main body of the bushing. A shoulder 46 on the wall of the bushing rests on the periphery of an opening 48 in the bracket platform 30 and the bushing is held in place by a threaded ring nut 50. The bushing is preferably formed of a material such as bronze which can have a bearing relationship with the plate 30 to carry the plastic strip wind assembly and to have a limited angular motion relative to the platform 26.

An opening 60 in the platform 26 counterbored from the top surface leaves a support flange 62 and interposed between this flange and the flange 42 of the bushing are opposed Belleville spring washers 64. Suitable clearance will be provided between the bushing and the flange 62 to guide the support for rotation and reciprocation.

It will be seen that pressure applied to the film 34 on the glass 36 will be applied against the springs 64 to cause a downward motion of the entire assembly including the sub-plate 30 and support plate 32. The spring 64 will, of course, by calibrated to provide proper resistance to this motion to obtain a good fingerprint impression. A limit switch 66 with a suitable sensor arm 68 is provided to operate a signal 70 which is indicated as audio signal although it might also be visual so that when adequate pressure has been applied to the film 34 the operator will be notified to release the pressure.

What is claimed as new is as follows:

1. A fingerprint input assembly for an identification system which comprises:
   a. first means having a transparent surface for application of a fingerprint to be treated as input data,
   b. resilient means supporting said first means wherein said first means is movable in response to the application of pressure to said surface, and
   c. a signal means responsive to predetermined motion of said first means to notify a person applying his fingerprint of adequate application pressure.

2. A fingerprint input assembly for an identification system which comprises:
   a. first means having a transparent surface for application of a fingerprint to be treated as input data,
   b. support means comprising a mount plate,
   c. housing means for said first means,
   d. resilient means interposed between said housing means and said mount plate to permit relative motion therebetween upon application of pressure to said surface, and
   e. means responsive to said relative motion to transmit a signal to a person applying his fingerprint to said surface.

* * * * *